United States Patent
Hall, Jr.

(10) Patent No.: US 8,469,517 B2
(45) Date of Patent: Jun. 25, 2013

(54) MODULAR MULTI-COLOR LED ILLUMINATION SYSTEM AND METHOD FOR POLARIZING AND DIRECTING LED LIGHT SIGNALS INTO A COPLANAR ORIENTATION

(75) Inventor: Estill Thone Hall, Jr., Fishers, IN (US)

(73) Assignee: Shenzhen TCL New Technology Ltd., Shenzhen, Guangdong (CN)

( * ) Notice: Subject to any disclaimer, the term of this patent is extended or adjusted under 35 U.S.C. 154(b) by 325 days.

(21) Appl. No.: 12/740,284

(22) PCT Filed: Dec. 27, 2007

(86) PCT No.: PCT/US2007/088965
§ 371 (c)(1),
(2), (4) Date: Apr. 28, 2010

(87) PCT Pub. No.: WO2009/073042
PCT Pub. Date: Jun. 11, 2009

(65) Prior Publication Data
US 2010/0253859 A1      Oct. 7, 2010

(30) Foreign Application Priority Data

Dec. 4, 2007    (CN) .......................... 2007 1 0124802

(51) Int. Cl.
*G03B 21/14*      (2006.01)
*G03B 21/00*      (2006.01)
(52) U.S. Cl.
USPC ............................................. 353/20; 353/31
(58) Field of Classification Search
USPC .................... 353/8, 20, 30, 121, 31; 362/555, 362/612; 359/483.03, 485.01, 485.03, 485.06, 359/485.07
See application file for complete search history.

(56) References Cited

U.S. PATENT DOCUMENTS

| | | | |
|---|---|---|---|
| 6,584,283 B2 | 6/2003 | Gabello et al. | |
| 6,902,310 B2 | 6/2005 | Im | |
| 7,077,525 B2 | 7/2006 | Fischer et al. | |
| 7,369,318 B2 | 5/2008 | Yang | |
| 2004/0070736 A1 | 4/2004 | Roddy et al. | |
| 2005/0179041 A1* | 8/2005 | Harbers et al. ................. | 257/80 |
| 2005/0237488 A1 | 10/2005 | Yamasaki et al. | |
| 2006/0007407 A1 | 1/2006 | Matsui | |

(Continued)

FOREIGN PATENT DOCUMENTS

| | | |
|---|---|---|
| EP | 1645906 A1 | 4/2006 |
| JP | 2003-330106 A | 11/2003 |

(Continued)

OTHER PUBLICATIONS

Extended European Search Report, EP 07866070, mailed Dec. 7, 2010.

*Primary Examiner* — Pascal M Bui Pho
(74) *Attorney, Agent, or Firm* — Fletcher Yoder

(57) ABSTRACT

The present invention is directed to an illumination system. The illumination system comprises a plurality of modules comprising a plurality of light emitting diodes (LEDs) adapted to emit light signals. The illumination system further comprises a plurality of polarizing elements disposed subsequent to the LEDs. Each of polarizing elements is adapted to render a unique polarization to the light signals emitted by a respectively corresponding one of the modules. Further, the illumination system comprises a polarization converting element disposed subsequent to the plurality polarizing elements. The polarization converting element is adapted to uniformly polarize all of the light signals emitted by the plurality of modules.

20 Claims, 4 Drawing Sheets

U.S. PATENT DOCUMENTS

| | | |
|---|---|---|
| 2006/0072078 A1 | 4/2006 | Kim et al. |
| 2006/0119941 A1* | 6/2006 | Yang et al. ............ 359/566 |
| 2006/0119943 A1 | 6/2006 | Yang |
| 2006/0146297 A1 | 7/2006 | Lee |
| 2006/0164607 A1 | 7/2006 | Morejon et al. |
| 2006/0164857 A1* | 7/2006 | Morejon et al. ......... 362/555 |
| 2006/0238720 A1* | 10/2006 | Lee et al. ............... 353/38 |
| 2008/0094577 A1* | 4/2008 | Krijn et al. ............. 353/20 |

FOREIGN PATENT DOCUMENTS

| | | |
|---|---|---|
| JP | 2006-058488 A | 3/2006 |
| KR | 10-2002-0065037 B1 | 8/2002 |
| KR | 10-2006-0062900 B1 | 6/2006 |
| WO | 2009/073040 A1 | 6/2009 |
| WO | 2009/073041 A1 | 6/2009 |
| WO | 2009/082499 A1 | 7/2009 |
| WO | 2009/097387 A3 | 8/2009 |

\* cited by examiner

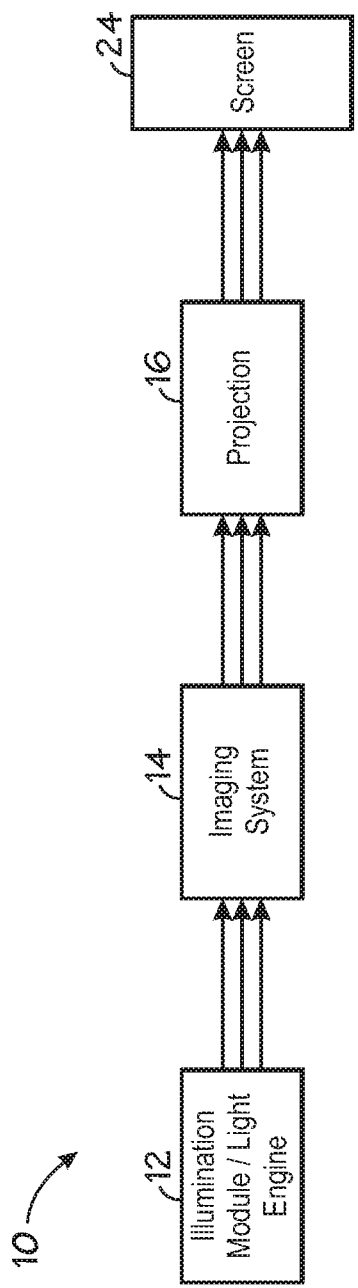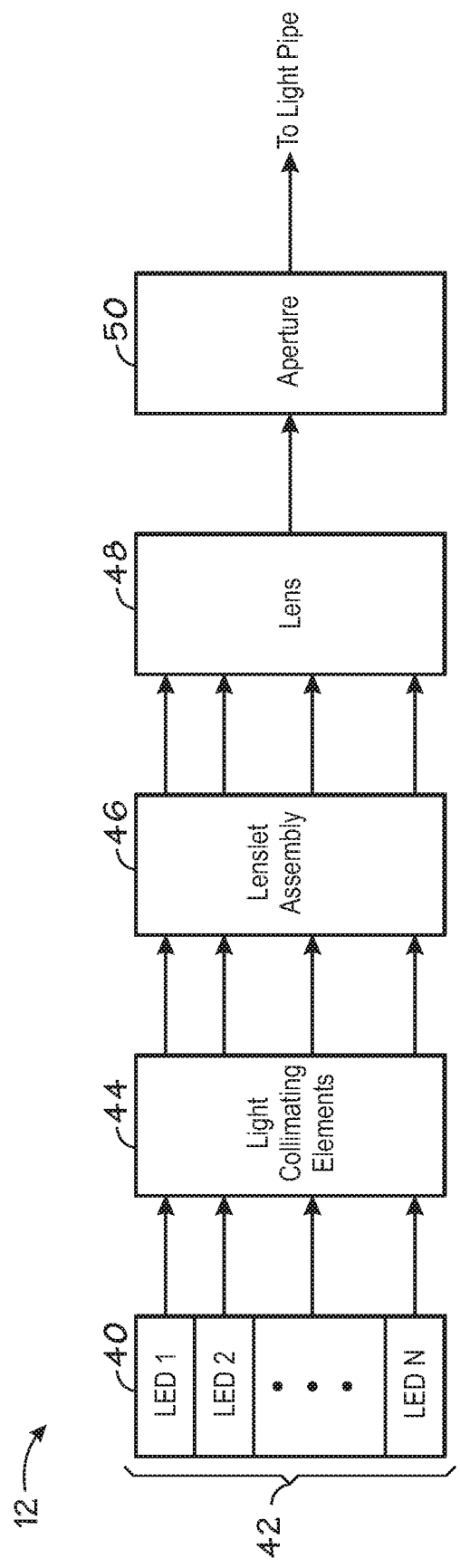

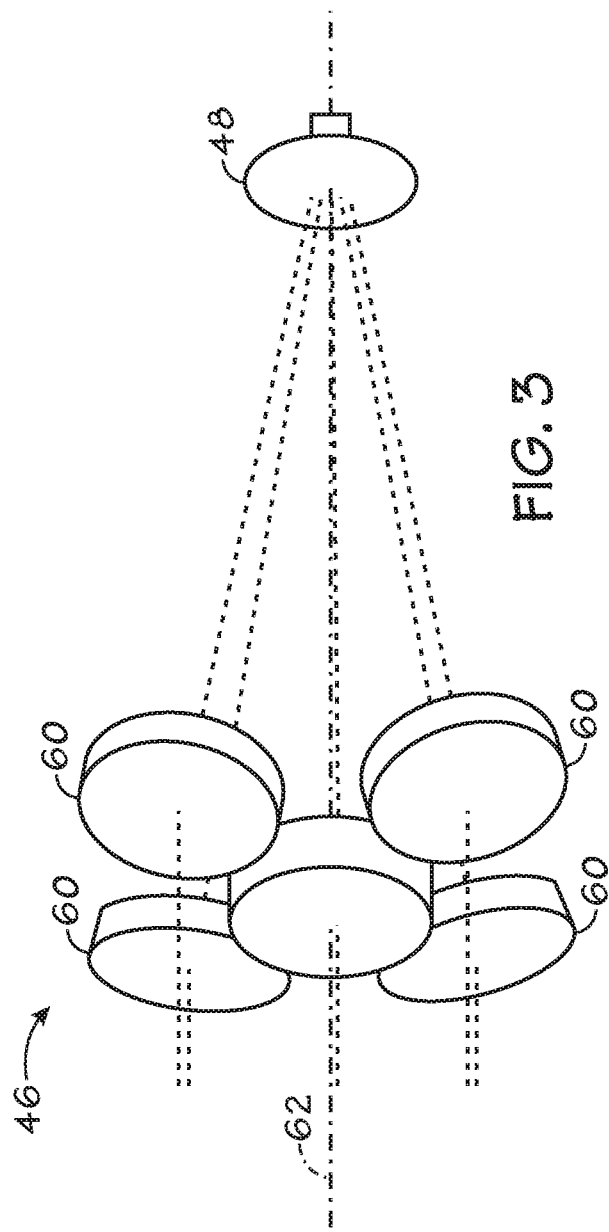

MODULAR MULTI-COLOR LED ILLUMINATION SYSTEM AND METHOD FOR POLARIZING AND DIRECTING LED LIGHT SIGNALS INTO A COPLANAR ORIENTATION

FIELD OF THE INVENTION

The present invention relates generally to video display and projection systems. More specifically, the present invention relates to illumination systems of video display and projection systems.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Typically, video display and projection systems employ an illumination system (for example, a light engine) for generating light ultimately used to form an image. Liquid crystal on silicon (LCOS) systems and/or multi-imager systems, such as high temperature polysilicon (HTPS) systems, or even digital light processor (DLP) systems typically employ a single illumination system that utilizes a specialized high pressure mercury arc lamp as an illumination source. The arc lamp is adapted to provide the illumination system with white light, which is subsequently split or dispersed using optical devices (e.g., color wheel, filters, etc.) into three primary colors, namely, red green and blue (RGB). Thereafter, the RGB light is combined using yet additional optical devices for generating a colored image.

The usage of arc lamps as an illumination source in video units has various shortcomings. For example, LCOS systems may require high power illumination, such that the power provided by the arc lamps is insufficient for optimally satisfying illumination requirements of such systems. In addition, arc lamps used in the above systems may have a relatively short lifetime and may require frequent replacement. In addition, because the multiple imagers in the above systems are dependent on the single lamp as an illumination source, all of the imagers of the system can become simultaneously non-operational should the lamp malfunction. Further, replacement of the lamp may be cumbersome, requiring major disassembly of the entire display system and/or some of its elements. In addition, the above mentioned optical and other devices typically used to disperse and, thereafter, recombine the light may occupy a substantial amount of space within the illumination and projection systems in which they are employed. Accordingly, these optical devices may dictate that the video display unit in which they are disposed is undesirably large. Further, mercury contained within some of the arc lamps render those lamps environmentally unfriendly.

BRIEF DESCRIPTION OF THE DRAWINGS

Advantages of the invention may become apparent upon reading the following detailed description and upon reference to the drawings in which:

FIG. 1 is a block diagram of a video unit in accordance with an exemplary embodiment of the present invention;

FIG. 2 is a block diagram of an illumination system in accordance with an exemplary embodiment of the present invention;

FIG. 3 is a perspective view of a lenslet assembly in accordance with an embodiment of the present invention;

DETAILED DESCRIPTION

Figure 4:
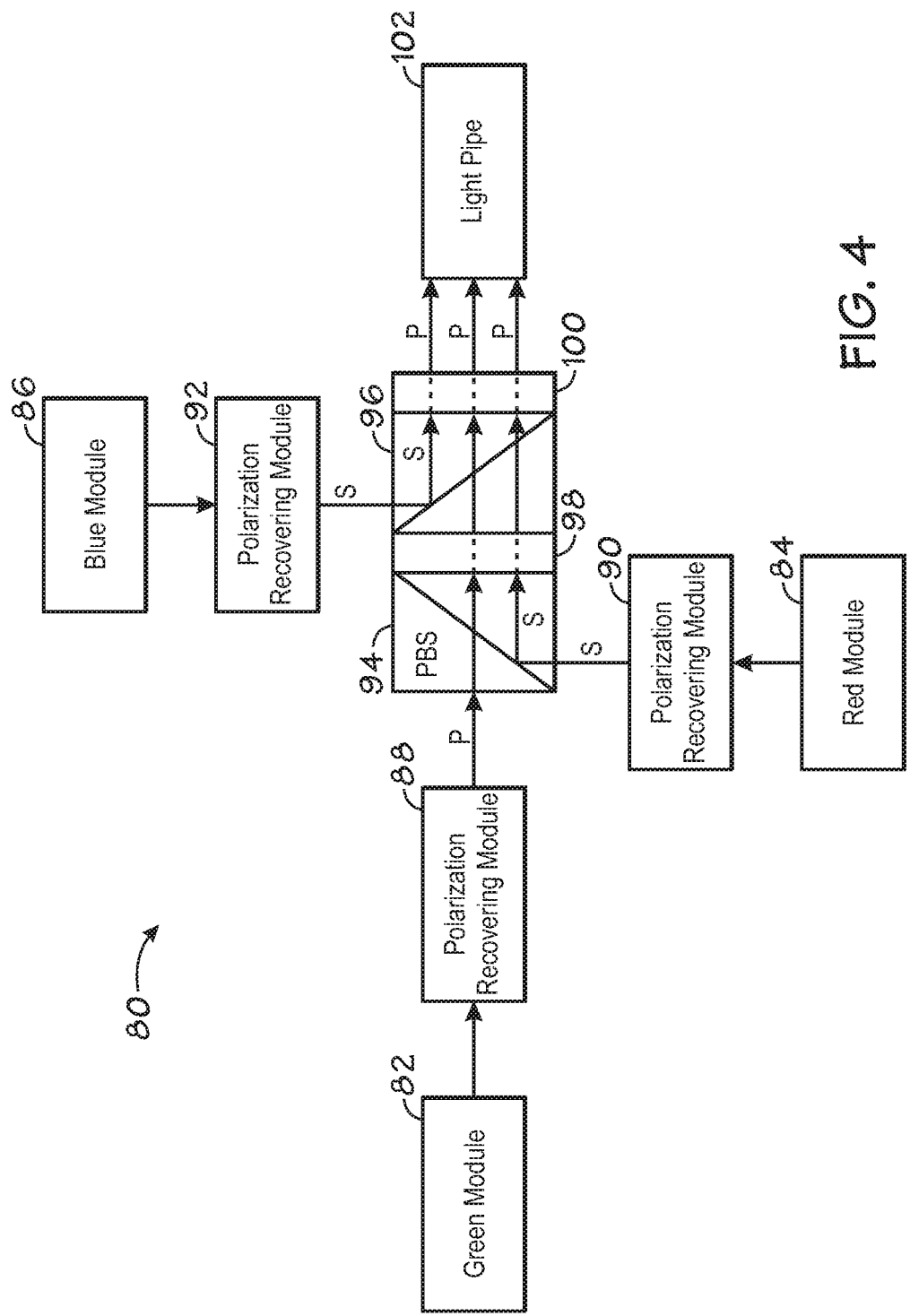
FIG. 4 is block diagram of another illumination system in accordance with an exemplary embodiment of the present invention.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Turning initially to FIG. 1, a block diagram of a video unit in accordance with one exemplary embodiment of the present invention is illustrated and generally designated by a reference numeral 10. In the illustrated embodiment, the video unit 10 may comprise a Digital Light Processing ("DLP") projection television or projector or the like. In another embodiment, the video unit 10 may comprise a liquid crystal display ("LCD") projection television or projector or the like. In still other embodiments, the video unit 10 may comprise a liquid crystal on silicon (LCOS) projector, a high temperature poly-silicon (HTPS) or another suitable form of projection television or display.

The video unit 10 includes a light engine/illumination system 12. The illumination system 12 is configured to generate white or colored light that can be employed by an imaging system 14 to create a video image. The illumination system 12 may be made up of multiple illumination systems, for example, such as those used in LCOS and/or HTPS systems. As will be discussed in further detail below, the illumination system 12 includes optical and electro-optical components adapted to replace arc lamps otherwise used in conventional systems. The illumination system 12 includes module(s) having a collection of pulsed light emitting diodes (LEDs) adapted to emit, for example, RGB light at various intensities. As will be further shown below, the illumination system 12 further includes an optical device, referred to herein as a lenslet assembly. The lenslet assembly is a collection of lens elements whose number is equal to the number of the above-mentioned LEDs. The lenslet assembly is adapted to collect and further transmit the RGB light emanating from the LEDs onto an aperture. In this manner, the illumination system 12 is configured to efficiently convey the light provided by the illumination system 12 onward to a light pipe of the video unit 10. As those skilled in the art will appreciate, the term light pipe used herein refers to components and optical connections/coupling of the video unit 10 disposed subsequent to the illumination system 12. Such components of the video unit 10 may include an imaging system, a projection system, a screen, optical devices couplings and so forth.

Hence, the illumination system 12 utilizes a plurality of LEDs instead of an arc lamp as an illumination source. In other words, rather than employing a lamp for generating white light and components (e.g., color wheels, dichroic mirrors, polarizes, filters, etc.) for dispersing and separating the white light, the illumination system 12 efficiently combines the light produced by the LEDs at the outset to form colored and white light at various intensities. The video unit 10, therefore, may be made to be smaller in size as compared to those systems employing arc lamps and/or similar devices used for generating white light as an illumination source.

As described above, the illumination system 12 may be configured to project, shine, or focus colored light at the imaging system 14. The imaging system 14 may be configured to employ the colored light to create images suitable for display on a screen 24. It should be appreciated that the imaging system 14 could be made up of multiple imaging systems, such as those used in HTPS or LCOS systems having multiple imagers.

The imaging system 14 may be configured to generate one or more pixel patterns that can be used to calibrate pixel shifting in the video unit 10. In one embodiment, the imaging system 14 comprises a DLP imaging system that employs one or more DMDs to generate a video image using the colored light. In another embodiment, the imaging system 14 may employ an LCD projection system. It will be appreciated, however, that the above-described exemplary embodiments are not intended to be exclusive, and that alternate embodiments, any suitable form of imaging system 14 may be employed in the video unit 10.

The imaging system 14 illustrated in FIG. 1 may be configured to project images into a projection lens assembly 16. The projection lens assembly 16 may include one or more lenses and/or mirrors that project the image created by the imaging system 14 onto the screen 24.

FIG. 2 is a block diagram of the illumination system 12 in accordance with an exemplary embodiment of the present invention. As mentioned above, the illumination system 12 includes light generating and collecting components adapted to convey the colored light to imaging and projection devices of the video unit 10 (FIG. 1). The illumination system 12 includes an LED module 40 adapted to house a plurality of LEDs 42. Each of the LEDs 42 may be pulsed at a certain fast rate. Further, each of the LEDs 42 contained within the module 40 may be adapted to emit red, green or blue light. Other embodiments may incorporate LEDs, i.e., LEDs 42, adapted to emit light of various colors, some of which may be different from red, green or blue. In addition, the module 40 may be adapted to house N LEDs. In an exemplary embodiment, the module 40 may be adapted to house up to eleven LEDs. In other exemplary embodiments, the module 40 may include up to five or seven LEDs. In still other exemplary embodiments, the illumination system 12 may be adapted to include multiple LED modules, such as the modules 40. In such embodiments, each of the modules 40 may be adapted to house a different number of LEDs. It should be noted that the number of LEDs included within each of the modules 40 may be determined by system design and/or operation criteria and/or by cost effective goals.

Hence, the module 40 is adapted to house combinations of RGB LEDs. Such combinations can be used, for example, to accentuate and/or suppress light of a specific color. For instance, a suitable combination of LEDs can configure the video unit 10 to produce images having hues that are relatively greater in red than blue. This may be achieved by including within the module 40 a greater number of LEDs producing red light than those LEDs producing blue light. Similarly, the module 40 may be adapted to house other combinations of LEDs, such as those envisioned to output light with enhanced and/or suppressed color(s) of different kinds.

The ability to incorporate and/or change the amount of LEDs within the illumination system 12 is facilitated by a modular design of the module 40. That is, each of the LEDs 42 may be independently coupled to the module 40 such that one or more of the LEDs 42 can be replaced and/or removed form the module 40 with minimal effort. Further, should one or more of the LEDs 42 malfunction or otherwise become idle, the video unit 10 may continue to project images despite some loss in color and/or brightness. Hence, unlike systems employing arc lamps whose malfunction renders the entire video unit nonfunctional, the present technique enables the video unit to continue operating even though one or more of the LEDs is non operational. Further, those skilled in the art will appreciate that the average lifetime of an LED is far greater than the average lifetime of an arc lamp. This yet provides another advantage of using the LEDs 42 as an illumination source rather the mercury lamp used in conventional systems.

The illumination system 12 further includes a plurality of light collimating elements or collimators 44 adapted to efficiently collect the light produced by the LEDs 42. In an exemplary embodiment, each of the collimators 44 may be disposed near or directly adjacent to each of the LEDs 42. In other exemplary embodiments, each of the collimators 44 may surround each of the LEDs 42 such that the LEDs 42 may be partially embedded within the collimators 44. Each of the collimators 44 is adapted to intake a maximal amount of light emanating from the LED to which the collimator is coupled. In so doing, the collimators 44 increase the light gathering ability of the illumination system 12. This ensures that the majority of the light produced by the LEDs 42 can be efficiently provided to and utilized by subsequent optical components of the video unit 10 for generating an image.

The illumination system 12 further includes a lenslet assembly 46. The lenslet assembly 46 includes a plurality of optical components, referred to herein as lenslets or lens elements. Hence, the lenslet assembly 46 is a collection of individual lenslets or lens elements. The number of lenslets included in the lenslet assembly 46 corresponds to the number of LEDs 42 included in the module 40. Each of the lenslets is adapted to receive light emitted by a respective LED 42 and collimator 44. Further, after receiving the light for the respective LED, each of the lenslets of the assembly 46 is adapted to redirect the light onto a lens 48 disposed subsequent to the lenslet assembly 46. The lenslet assembly 46 is geometrically oriented relative to an axis for optimally receiving and redirecting the light emanating from each of the respective LEDs 42 onto the lens 48. In so doing, the lenslets 46 ensure that the lens 48 receives and collects a maximal amount of light emitted by the LEDs 42. Further, once the lens 48 receives the redirected light, the lens 48 focuses the light onto an aperture 50. The aperture 50 is adapted to transmit the light into a light pipe comprising additional imaging and projection components, as discussed hereinabove in relation to FIG. 1.

The lenslet assembly 46 is adapted to provide a unique intensity distribution at the aperture 50 for each of the LEDs 42. The intensity distribution for each of the LEDs 42 at the aperture 50 depends on the location of each of the LEDs 42 in module 40 and on the orientation of the respective lenslets 46 relative to lens 48. By virtue of including the lenslet assembly 46 within the illumination system 12, proper intensity levels of the LEDs 42 are obtained at the aperture 50 for projecting an image. In other words, absent the lenslet assembly 46, the light emerging from the LEDs 42 cannot be collected efficiently at aperture 50 for projecting a viewable image.

FIG. 3 is perspective view of an illumination system including a lenslet assembly, in accordance with an embodiment of the present technique. The lenslet assembly depicted in FIG. 3 is similar to the assembly discussed herein in relation to FIG. 2. As illustrated, the lenslet assembly 46 is disposed subsequent the lens 48. In the illustrated embodiment, the lenslet assembly 46 forms a structure that includes five lenslets 60, corresponding to five LEDs included within the module 40 (FIG. 2). Other exemplary embodiments may include lenslet assemblies having a different number of lenslets, for example, such as seven or eleven lenslets, corresponding to a similar number of LEDs. Each of the lenslets 60 may be made up from an optical plastic, such as an acrylic complex or a similar material. Each of the lenslets 60 may be molded into a semi-convex structure having a lens-like structure. In the illustrated embodiment, each of the lenslets 60 may have one flat-shaped side facing the module 40 (FIG. 2), and one relatively curved/convex shaped-side facing the lens 48.

As further illustrated by FIG. 3, each of the lenslets 60 is disposed about an axis 62. While in the illustrated embodiment, the lenslet assembly 46 may be disposed symmetrically transverse relative to the axis 62, other embodiments may include disposing the lenslet assembly 46 asymmetrically transverse relative to the axis 62. Further, each of the lenslets 60 may generally have a unique orientation relative to the axis 62, the module 40 (LEDs 42) and the lens 48. The unique orientation of each of the lenslets 60 relative to the aforementioned components ensures that each of the lenslets 60 optimally captures the light emitted by the respective LEDs disposed within the module 40. In other words, each of the lenslets 60 is adapted to optically couple its respective LED 42 to the lens 48.

FIG. 4 is another illumination system in accordance with an embodiment of the present technique. Illumination system 80 may be used as an illumination source in the video display unit 10 of FIG. 1. Accordingly, the system 80 includes multiple components similar to those discussed above in relation to the illumination system 12 of FIG. 2. The illumination system 80 is adapted for display units that require high power illumination and/or display units employing multiple imagers. Such display units may include LCOS and/or HTPS systems or large projectors used to project very large images, such as those, encountered, for example, in theaters, cinemas or the like.

In an exemplary embodiment, the illuminations system 80 includes three illumination modules referred to by reference numerals 82, 84 and 86. The illumination modules 82-86 are similar to the illumination system 12 of FIG. 2. That is, each of the illumination modules 82-86 includes an LED module (e.g., module 40) have a plurality of LEDs 42, and collimators, such the collimators 44. Each of the modules 82-86 may include a different number of LEDs, where each LED may emit light signals of a specific color. In the illustrated embodiment, all of the LEDs within each of the modules 82-86 are adapted to emit light signals having a distinct color, such as R, G or B. In an exemplary embodiment, the module 82 may include G-type LEDs, the module 84 may include R-type LEDs and the module 86 may include B-type LEDs.

In addition, each of the modules 82-86 includes a lenslet assembly, such as the lenslet assembly 46, having a plurality of lenslets 60. The function and structural characteristics and attributes of the lenslet assemblies included within the modules 82-86 is similar to those described above in relation to the illumination system 12, incorporated herein by reference.

The illumination system 80 further includes three polarization recovery modules 88, 90 and 92 disposed subsequent to each of the illumination modules 82-86, respectively. The polarization recovery modules 88-92 are each adapted to receive unpolarized light and subsequently output the light with a specific polarization. The illumination system 80 further includes two polarizing beam splitters (PBSs) 94 and 96, adapted to receive polarized light from the polarization recovery modules 88-92. Each of the PBSs 94, 96 may be adapted to reflect light having certain polarization at a certain angle (e.g., 90 degrees, i.e., right angle), while transmitting light having a different polarization. For example, the PBSs 94 and 96 may reflect s-polarized light at a right angle, while transmitting p-polarized light straight through.

The PBSs 94 and 96 are used in conjunction with a plurality of ColorSelects™ 98 and 100 disposed adjacent to PBSs 94 and 96, respectively. The ColorSelects™ 98 and 100 are adapted to convert the polarization of certain light signals. For example, ColorSelects™ 98 (also referred to as red/cyan ColorSelects™) converts, i.e., rotates, s-polarized light into p-polarized light. The ColorSelects™ 100 (also referred to as blue/yellow ColorSelects™) converts the polarization of light in a manner similar to that performed by the ColorSelects™ 98. The PBSs 94 and 96 and the ColorSelects™ 98 and 100 may also be collectively referred to herein as a polarizing converting element.

Hence, the above components of the illumination system 80 are adapted to provide light pipe 102 with light having uniform polarization. Accordingly, the light provided by the LEDs within the illumination modules 82-86 comprises mixed (i.e., s and p) polarizations. The polarization recovery modules 88-92 recover one of the polarizations, i.e., s or p, from the light signals provided by each of the polarization recovery modules 88-92. For example, green light provided by the module 82 may be rendered by the polarization recovery module 88 as p-polarized. Such p-polarized light signals may propagate through the PBSs 94, 96 and ColorSelects™ 98 and 100 unaltered until reaching the light pipe 102. Further, red light provided by the module 84 is rendered by the polarization recovery module 92 as s-polarized. The PBS 94 reflects the red s-polarized light at a right angle so that it is coplanar with the p-polarized green light provided by the module 82. Thereafter, the ColorSelects™ 98 converts the s-polarization of the red light into p-polarization. In this manner, the red p-polarized light propagates to the light pipe 102 while being unaffected by the PBS 96 and the ColorSelects™ 100.

Similarly, blue light emitted by the module 86 is rendered by the polarization recovery modules as s-polarized. Hence, upon reaching the PBS 96, the blue light is reflected at a right angle so that it is coplanar with the green and red light provided by the modules 82 and 84, respectively. Thereafter, the blue light signals reach the ColorSelects™ 100, which converts the polarization of blue light from to p. Thereafter, the blue p-polarized light signals are provided to the light pipe 102. In this manner, the RGB light signals emitted by the modules 82-86 are provide to the light pipe 102 with uniform polarization, i.e., p-polarization. Those skilled in the art will appreciate that the illumination system 80 can employ other polarization schemes, such as those capable of providing the light pipe 102 light signals that are s-polarized.

Figure 5:
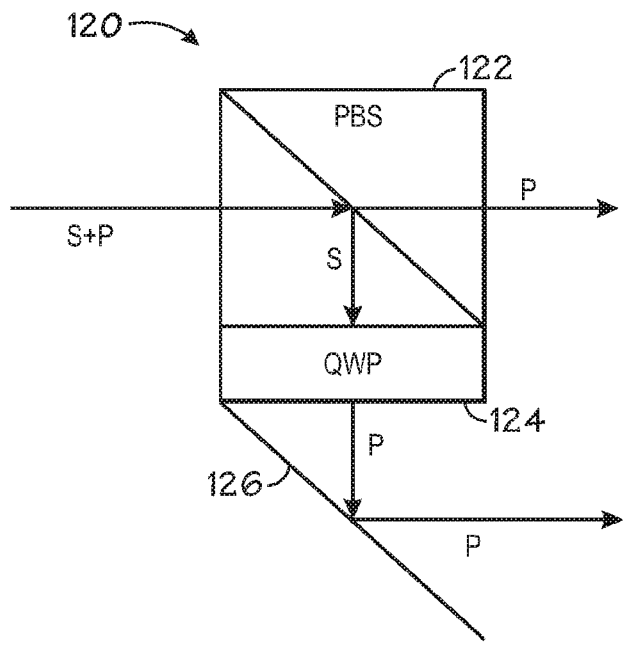
FIG. 5 is a polarization converting element used in an illumination system in accordance with an embodiment of the present technique.

FIG. 5 is a polarizing device used in illuminations system of a display system, in accordance with an embodiment of the present technique. Polarizing device 120 may be used in the illumination system 80 of FIG. 4. The polarizing device can be used as a light polarizing converting element, such the PBSs 94, 96 and the ColorSelects™ 98, 100. Accordingly, the polarizing device 120 includes a PBS 122 coupled to a quarter wave plate (QWP), which in turn is coupled to a plane mirror 126. The plane mirror 126 extends from the QWP, such that it makes an angle of 45 degrees with respect to the QWP.

The polarization device 120 operates such that when unpolarized light signals (i.e., a mixture of s and p-polarized light) impinge the PBS 122, the p-polarized portion of the light propagates straight through the PBS 122, while the s-polarized portion of the light is reflected downwards at a right angle. The QWP receives the s-polarized portion of the light and converts, i.e., rotates the polarization of the light so that it becomes p-polarized. Thereafter, the converted p-polarized light reflects of the mirror 126 at a right angle so that it is coplanar with the initial p-polarized light. In this manner, the polarization device 120 converts all of the incoming unpolarized light into p-polarized light.

Figure 6:
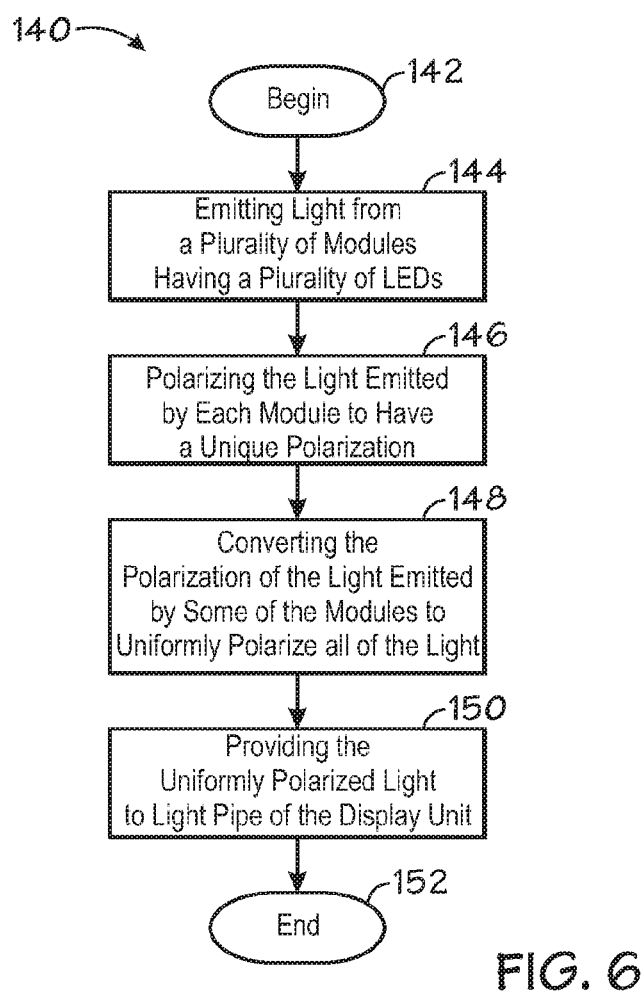
FIG. 6 is a process flow diagram showing a method for illuminating a video unit, in accordance with an exemplary embodiment of the present invention.

FIG. 6 is a process flow diagram showing a method for illuminating a projection system in accordance with an exemplary embodiment of the present invention. The method is generally referred to by the reference number 140. The method 140 can be applied to the illumination systems 80 of FIG. 4. The method 140 begins at block 142. Process flow then proceeds to block 144, in which an illumination system of a video unit emits light by a plurality of modules, such as modules 82-86, where each module includes a plurality of LEDs (e.g., LEDs 42). Block 144 may also include an act of collimating the emitted light, as may be performed by the collimators 44 (FIG. 2). Block 144 may also include the act of lensing the light by lenslet assemblies, such as lenslet assemblies 46, each having a plurality of lenslets 60 (FIGS. 2 and 3, respectively). Thereafter, at block 146, the light emitted by each of the modules 82-86 is polarized, such that the light provided by each of the modules 82-86 has a unique polarization. For example, the light signals emitted by some of the modules may be rendered as s-polarized, while other light signals emitted by other modules may be rendered as p-polarized.

From block 146, the method 140 proceeds to block 148, where the polarization of the light emitted by some of the illumination modules (e.g., illumination modules 82-86) is converted into a different polarization. For example, s-polarized light signals provided by some modules may be converted so that they become p-polarized. In this manner, all of the light emitted by all of the modules becomes uniformly polarized. Next, at block 150, the uniformly polarized light is provided to a light pipe of a display system. The method terminates at block 152.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An illumination system, comprising:
a plurality of modules comprising a plurality of light emitting diodes (LEDs) configured to emit light signals, wherein the plurality of modules comprise a first module configured to emit light signals of a first color and a second module configured to emit light signals of a second color;
a plurality of polarizing elements comprising a first polarizing element configured to polarize the light signals of the first color to a first polarization and a second polarizing element configured to polarize the light signals of the second color to a second polarization different from the first polarization; and
a polarization converting element comprising at least two polarizing beam splitters and at least two polarization converters, wherein the polarization converting element is disposed subsequent to the plurality of polarizing elements and is configured to direct the light signals of the first color and the first polarization through the polarization converting element unaltered, to convert the light signals of the second color and the second polarization to the first polarization, and to reflect the light signals of the second color at a right angle so that the light signals of the second color exit the polarization converting element coplanar to the light signals of the first color.

2. The illumination system of claim 1, wherein the polarization converting element comprises at least one quarter wave plate (QWP), and at least one plane mirror disposed at angle relative to the QWP.

3. The illumination system of claim 1, wherein the at least two polarizing beam splitters are configured to convert s-polarized light into p-polarized light and configured to reflect s-polarized light at a right angle.

4. The illumination system of claim 1, wherein the plurality of modules each comprise lens elements, wherein a number of lens elements contained within each module corresponds to a number of LEDs respectively contained within each module.

5. The illumination system of claim 1, wherein a first polarizing beam splitter of the at least two polarizing beam splitters of the polarization converting element is configured to receive the light signals of the first color and first polarization as well as the light signals of the second color and second polarization, and configured to provide the received light signals to a first polarization converter of the at least two polarization converters of the polarization converting element.

6. The illumination system of claim 5, wherein the first polarization converter is configured to convert the light signals of the second color and second polarization to light signals of the second color and first polarization and configured to allow the light signals of the first color and the first polarization to pass through unaltered.

7. The illumination system of claim 6, wherein the plurality of modules comprises a third module configured to emit light signals of a third color, wherein the plurality of polarizing elements comprise a third polarizing element configured to polarize the light signals of the third color to the second polarization, and wherein the polarization converting element is configured to covert the light signals of the third color and the second polarization to the first polarization, and to reflect the light signals of the third color at a right angle so that the light signals of the third color exit the polarization converting element coplanar to the light signals of the first color and to the light signals of the second color.

8. The illumination system of claim 7, wherein a second polarizing beam splitter of the at least two polarizing beam splitters of the polarization converting element is configured to receive the light signals of the first color and first polarization from the first polarization converter, the light signals of the second color and first polarization from the first polarization converter, the light signals of the third color and the second polarization from the third polarizing element, and configured to provide the received light signals to a second polarization converter of the at least two polarization converters of the polarization converting element.

9. The illumination system of claim 8, wherein the second polarization converter is configured to convert the light signals of the third color and second polarization to light signals of the third color and first polarization and configured to allow the light signals of the first color and the first polarization and the light signals of the second color and the first polarization to pass through unaltered.

10. A method of operating an illumination system of a video unit, comprising:
   emitting light signals from a plurality of modules, wherein each of the modules comprises a plurality of light emitting diodes (LEDs), and wherein the plurality of modules comprise a first module configured to emit light signals of a first color and a second module configured to emit light signals of a second color;
   polarizing the light signals of the first color from the first module to a first polarization using a first polarizing element;
   polarizing the light signals of the second color from the second module to a second polarization using a second polarizing element, wherein the second polarization is different from the first polarization;
   directing the light signals of the first color and the first polarization from the first polarizing element through two polarizing beam splitters and two polarization converters of a polarization converting element without alteration; and
   directing the light signals of the second color and the second polarization from the second polarizing element through the two polarizing beam splitters and the two polarization converters of the polarization converting element such that light signals of the second color and first polarization exit the polarization converting element coplanar to the light signals of the first color.

11. The method of claim 10, comprising providing the uniformly polarized light to a light pipe of a video display unit for forming an image.

12. The method of clam 10, comprising pulsing the light emitted by each of the plurality of LEDs.

13. The method of claim 10, comprising collimating and lensing the light signals emitted by the plurality of LEDs within each of the plurality of modules.

14. The method of claim 10, comprising:
   emitting the light signals from the plurality of modules, wherein the plurality of modules comprises a third module configured to emit light signals of a third color; and
   polarizing the light signals of the third color to the second polarization using a third polarizing element.

15. The method of claim 14, comprising:
   directing the light signals of the third color and the second polarization from the third polarizing element through one of the two polarizing beam splitters and one of the two polarization converters of the polarization converting element such that light signals of the third color and first polarization exit the polarization converting element coplanar to the light signals of the first color and the second color.

16. A video unit, comprising:
   an illumination system, comprising:
      a plurality of modules comprising a plurality of light emitting diodes (LEDs) configured to emit light signals, wherein the plurality of modules comprise a first, second, and third module configured to respectively emit light signals of a first color, a second color, and a third color;
      a plurality of polarizing elements comprising a first, second, and third polarizing element configured to respectively polarize the light signals of the first color to a first polarization, the light signals of the second color to a second polarization, and the light signals of the third color to the second polarization, wherein the first polarization is different from the second polarization; and
      a polarization converting element consisting essentially of two polarizing beam splitters and two polarization converters, wherein the two polarizing beam splitters and two polarization converters are configured to direct the light signals of the first color through the polarization converting element unaltered, configured to respectively convert the light signals of the second color and the third color to the first polarization, and configured to reflect the light signals of the second color and third color at right angles to exit the polarization converting element coplanar to the light signals of the first color.

17. The video unit of claim 16, wherein the polarization converting element is configured to convert s-polarized light into p-polarized light.

18. The video unit of claim 16, wherein the polarization converting element is configured to reflect s-polarized light at a right angle.

19. The video unit of claim 16, comprising:
   an imaging system configured to form an image based on the light receive from the illumination system; and
   a projection system configured to project the image on a screen of the video unit.

20. The video unit of claim 16, wherein each of the plurality of modules of the illumination system comprises a plurality of LEDs, and wherein each of the plurality of LEDs is configured to emit red, green, or blue light.

* * * * *